(12) United States Patent
Calvert

(10) Patent No.: US 11,254,397 B1
(45) Date of Patent: Feb. 22, 2022

(54) SHIP FOR REMOVAL OF PLASTIC FOR OCEAN CLEAN UP

(71) Applicant: Charlotte Calvert, Front Royal, VA (US)

(72) Inventor: Charlotte Calvert, Front Royal, VA (US)

(73) Assignee: Clean Ocean Associates, Trustee for Ocean Plastic Removal Trust, Front Royal, VA (US)

( * ) Notice: Subject to any disclaimer, the term of this patent is extended or adjusted under 35 U.S.C. 154(b) by 0 days.

(21) Appl. No.: 17/313,693

(22) Filed: May 6, 2021

(51) Int. Cl.
| | |
|---|---|
| *B63B 35/32* | (2006.01) |
| *B65G 15/28* | (2006.01) |
| *B65G 21/20* | (2006.01) |
| *F27B 14/12* | (2006.01) |
| *F23G 5/40* | (2006.01) |

(Continued)

(52) U.S. Cl.
CPC .............. *B63B 35/32* (2013.01); *B23B 41/00* (2013.01); *B29B 17/0412* (2013.01); *B29C 39/02* (2013.01); *B29C 39/22* (2013.01); *B63B 79/40* (2020.01); *B65G 15/28* (2013.01); *B65G 21/2081* (2013.01); *F23G 5/40* (2013.01); *F27B 14/12* (2013.01); *B29C 2793/009* (2013.01);

(Continued)

(58) Field of Classification Search
CPC . B63B 35/32; B63B 79/40; F23G 5/40; F27B 14/12; B29C 39/22; B29C 2793/0045; B29C 2793/009; B29C 39/02; B65G 21/2081; B65G 15/28; B29K 2105/26; B29B 17/0412; B32B 41/00

See application file for complete search history.

(56) References Cited

U.S. PATENT DOCUMENTS 3,453,706 A * 7/1969 Wilmer .................. B28B 21/10
425/162
3,917,241 A * 11/1975 Steffora .................. F27B 14/04
266/91

(Continued)

FOREIGN PATENT DOCUMENTS

| CN | 102657072 A | * | 9/2012 | |
| JP | 5288190 A | * | 7/1977 | ............. Y02A 40/81 |

OTHER PUBLICATIONS

"The Manta-Innovative eco-ship on the hunt for marine debris", Mar. 30, 2021, Waste Management World (Year: 2021).*

(Continued)

*Primary Examiner* — Michael M. Robinson
*Assistant Examiner* — Victoria Bartlett
(74) *Attorney, Agent, or Firm* — Louis Ventre, Jr.

(57) ABSTRACT

A specially-equipped ship is configured for environmental cleanup to collect plastic waste floating in the ocean. A method of using the ship is described. The specially-equipped ship can retrieve floating plastic waste in the ocean, shred it, melt it, and cool it to form a solidified block that is usefully employed to form an artificial reef on the ocean floor to house aquatic biota. The ship is outfitted with a conveyor belt fixed to the ship; a furnace to make molten plastic; a davit to drop the solidified block into the ocean to form a reef on the ocean floor. Optionally the ship includes a mold to contain molten plastic; a shredder; a storage compartment to receive plastic particles from the shredder; a fish escape; a vertical wall; a boring machine; photovoltaic cells and/or windmills to produce electric energy.

16 Claims, 7 Drawing Sheets

(51) Int. Cl.
*B23B 41/00* (2006.01)
*B29C 39/02* (2006.01)
*B29C 39/22* (2006.01)
*B63B 79/40* (2020.01)
*B29B 17/04* (2006.01)
*B29K 105/26* (2006.01)

(52) U.S. Cl.
CPC .. *B29C 2793/0045* (2013.01); *B29K 2105/26* (2013.01)

(56) References Cited

U.S. PATENT DOCUMENTS

| | | | | |
|---|---|---|---|---|
| 5,102,540 | A | * | 4/1992 | Conradi ................ E02B 15/046 210/232 |
| 6,431,792 | B1 | * | 8/2002 | Barnes .................... E02B 3/046 405/25 |
| 10,921,809 | B2 | | 2/2021 | Berg et al. |
| 2007/0158253 | A1 | * | 7/2007 | Kellett ................... B63B 35/32 210/776 |
| 2019/0336894 | A1 | * | 11/2019 | Heil ..................... B01D 33/463 |

OTHER PUBLICATIONS

The Ocean Cleanup, The Interceptor, web page at https://theoceancleanup.com/rivers/, downloaded May 2, 2021, Rotterdam, The Netherlands.

Daniel Boffey, Ocean cleanup device successfully collects plastic for first time, web page at https://www.theguardian.com/environment/2019/oct/03/ocean-cleanup-device-successfully-collects-plastic-for-first-time, downloaded May 2, 2021, The Guardian, U.S. edition, 61 Broadway, New York, NY 10006, published Oct. 4, 2019.

* cited by examiner

SHIP FOR REMOVAL OF PLASTIC FOR OCEAN CLEAN UP

TECHNICAL FIELD

In the field of ships, a marine vehicle intended for environmental restoration, the ship outfitted with accessories for collection and treatment of plastic wastes initially residing at or near the ocean surface and then providing for their disposal after treatment to create artificial reefs.

BACKGROUND ART

A world-wide and intractable pollution problem is plastic trash present in the oceans of the world. It has been estimated that the world produces 300 million tonnes of plastic a year. Eventually, all this plastic is discarded and much of it ends up in the ocean.

Presently, one source estimates that there are over 3,300 trillion pieces of plastic in the oceans. From small particles to larger pieces, plastic can now be found in the digestion system of many fish and others have said that 90% of seabirds have swallowed plastic.

Floating plastics often congregate in large expanses of the ocean, such as the Pacific garbage patch, which is one of five such sites around the world's major ocean gyres. Most plastics float on the water and they travel all over the world and in some areas they concentrate and build up and make the ocean look like a floating trash dump.

Junk plastics are a great danger to many types of marine life and they upset the careful ecological balance of nature. Plastic ocean debris can affect human health for those consuming fish and marine life as part of their diet.

SUMMARY OF INVENTION

A specially-equipped ship is configured for environmental cleanup to collect plastic waste floating in the ocean. The specially-equipped ship can retrieve floating plastic waste in the ocean, shred it, melt it, and cool it to form a solidified block that is usefully employed to form an artificial reef on the ocean floor to house aquatic biota.

The ship is outfitted with a conveyor belt fixed to the ship. The conveyor belt can be extended below the surface of the ocean where it engages with and draws up plastic waste onto the ship. The conveyor belt preferably is made with open-mesh screen for the belt, which allows water from the plastic waste to return to the ocean.

A furnace is attached to the ship at a location where it can heat the plastic waste to make molten plastic. A davit extending up from a deck of the ship removes a solidified block of plastic after the molten plastic hardens. The davit is configured to then drop the solidified block into the ocean to form a reef on the ocean floor.

Optionally the ship includes a mold to contain molten plastic. The mold preferably utilizes a removable shaft that extends through the molten plastic so as to create a vacant hole in the solidified block once the removable shaft is removed. A hydraulic jack may optionally be used to remove the removable shaft from the solidified block.

The ship optionally includes pipes extending through the molten plastic in molds. The pipes have a high melting temperature and will remain within the plurality of molds after hardening of the molten plastic.

The ship optionally includes: a shredder that receives the plastic waste from the conveyor belt and then mulches it to make particulates prior to being loaded into the furnace; a storage compartment to receive plastic particles from the shredder; a fish escape along a side of the conveyor belt configured to enable a fish on the conveyor belt to slide off the side of the conveyor belt; a vertical wall that is attached to the ship and extends upwardly from sea level at a side of the conveyor belt. The vertical wall can telescope outwardly from the ship to an end position beyond the conveyor belt so as to guide the plastic waste floating in the ocean towards the conveyor belt.

The ship optionally includes: a boring machine configured to bore a hole into the solidified block and collect the particles created by boring the hole for later addition to the furnace; a lid for the furnace so that melted plastic will not spill out due to sloshing from ocean waves; a fire pit configured to burn plastic waste as a source of heat for the furnace; and an array of photovoltaic cells and/or a windmill to produce electric energy for operation of electrical equipment on the ship.

A preferred method of using the ship includes steps of: navigating the ship on the ocean to a place where plastic waste is floating near the surface of the ocean; extending the conveyor belt downwardly to the subsurface point; drawing up plastic waste onto the ship using the conveyor belt; loading the plastic waste drawn up onto the ship into the furnace; powering the furnace to produce the molten plastic; cooling the molten plastic into the solidified block; and employing the davit to drop the solidified block onto the seabed.

Technical Problem

Years ago, when a person bought a cold beverage like a coke, it came in a glass bottle that was typically returnable to get a refund of the purchaser's deposit. The company would clean, recycle and reuse the beverage bottles over and over again. No beverage bottle trash was dumped into the ocean. Nowadays when millions of people drink a beverage in a plastic bottle, the environment ends up with millions of junk plastic bottles as trash. These will float in the oceans for years with all the other junk plastics.

Because the plastic takes a long time to break down in the ocean water and every year massive amounts of new plastic trash are added, plastic pollution in the oceans of the world can be considered an environmental tragedy.

New technology is urgently needed to address this problem. Taken to its ultimate end, plastic pollution could result in lifeless oceans or, at best, polluted aquatic biota unfit for human consumption.

There currently is no adequate technology to clean up the oceans' junk plastics. There are a few companies that pick up plastic trash along some beaches and they will make a little bracelet or item you can buy to feel like you care about the environment, but these efforts do next to nothing to remove the vast quantities of plastics throughout all of the world's oceans.

Solution to Problem

A new technology in the form of a specially-equipped ship is the solution. The specially-equipped ship is capable of extracting plastic pollution floating in our oceans, melting the plastic, and forming the plastic into blocks that could be used as non-floating artificial reefs capable of supporting marine life. This new technology could help return the careful ecological balance that once existed in our oceans before the advent of plastics.

The specially-equipped ship would be able to remove junk plastic floating in the ocean towards the goal of restoring the ocean to ecological balance. Fleets of these specially-equipped ships would help marine life by providing new habitat for them in artificial reefs on the sea floor. In certain parts of the world's oceans where plastics concentrate, these fleets of specially-equipped ships would be mobilized to remove floating plastic detritus just like a vacuum cleaner easily removes dirt from a rug.

Each specially-equipped ship could be anchored in an ocean gyre that has a heavy blanketed flow of circulating junk plastic. Such plastics often cover the water and an anchored ship would permit the plastic waste to flow into the specially-equipped ship for capture, treatment and reforming into blocks for creating artificial reefs on the ocean floor.

In one design, the front of the specially-equipped ship has a motorized and hydraulic scoop-up wide ramp that would unfold and angle down to the ocean with the leading-end of it dipping into the water. As masses of junk plastic flow into a catch ramp, the plastic junk would be guided and pushed toward the center ramp-section where a motorized conveyor belt would convey all of the plastics up and into the ship. The conveyor belt is perforated so that sea water can drain out, leaving mostly solid plastics. The conveyor belt would dump the plastics junk into a grinding mulcher that would shred the plastics junk into small plastic particles.

Once on the specially-equipped ship has shredded the plastic junk, the plastic particles could be melted into very beneficial marine-like habitat reef blocks that would be jettisoned to sink to the ocean floor and create a new marine habitat reef that would aid in sustaining marine life. Alternatively, the plastic particles could be brought back into a port where they could be recycled to make many types of new plastic products. This option is considered less practical because it would require considerably more energy for periodic trips back and forth between the specially-equipped ship and the port.

In another embodiment, the entire operation could be automated with smart software, artificial intelligence, and robotics, just like an automatic automobile assembly line. The shredded plastic on the specially-equipped ship could be auto-manufactured into reef blocks that are robotically dropped to the ocean floor to provide the new habitat for marine life.

In this embodiment, satellites could track the highest concentrations of ocean junk plastic, and the specially-equipped ship could be sent there to clean up those areas. After restoring that ocean area, ships can be sent to other areas that have plastic concentrations. Ships could be crewless to save money by not having to pay for crew or to feed them.

Ships could be left at specific ocean locations for months or years and clean the ocean by removing plastics 24 hours per day. If the specially-equipped ship took maximum advantage of solar energy, including wind energy, the specially-equipped ship could be set up to be energy self-sufficient, so it would not need to be refueled for very long periods of time. Energy generated from using some of the plastics as fuel could further reduce the need for refueling from shore.

For some embodiments, the control system for the specially-equipped ship would monitor and track critical components and production of blocks for the artificial reefs, so there could be government incentives or tax credits given to companies based on the amount of plastic trash that has been treated.

In some embodiments, a fleet of specially-equipped ships could be lined up together and strategically placed so they can create a large area of conveyor belts to remove plastic from the ocean gyres.

Advantageous Effects of Invention

It is now time that mankind uses technology in the form of a specially-equipped ship outfitted to remove junk plastics and treat them for disposal as artificial reefs in the ocean.

The specially-equipped ship is preferably designed to make plastic blocks suitable for serving as an artificial reef. In one embodiment, the shredded plastic particles are added to a melting furnace to create liquid plastic. The melted plastic is then drained, poured, pumped or injected into the molds that make the reef blocks. The blocks could be molded into any desired shapes and sizes. Preferably, the molds would provide for a number of holes in them where various types of marine life could make their new habitat. Once removed from the molds, the blocks could be dropped into the ocean to reside on the seabed in piles that would be suited to form an artificial reef. The specially-equipped ship could also deposit them at any other location determined by the Global Positioning System.

The specially-equipped ship could be used to address the plastics now contaminating many areas of the ocean and begin to halt the deteriorating conditions that are killing marine life. The specially-equipped ship could contribute to returning the ecological balance of nature or earth. The specially-equipped ship could not only save marine life, but could benefit it by providing new habitat.

Large corporations that care about our environment could sponsor fleets of the specially-equipped ships. Wealthy countries could hire fleets of these ships. Government organizations, like the United Nations, could have fleets of these ships.

For those that have dreamed about the beauty of our oceans before the onslaught of plastic trash, the specially-equipped ship could make that dream a beautiful environmental reality.

If one wants to bring the plastic particles back into port to be picked up and recycled, then they could be stored on the specially-equipped ship in different ways. They could be placed into a large storage area in the hull of the specially-equipped ship. They could be placed into large storage containers like a cargo-type container. They could be hydraulically compressed into large storage blocks. They could be sprayed with a type of glue and then compressed into storage blocks. There are many ways to store this plastic to make it take as little room as possible to enable the specially-equipped ship to transport it to be recycled.

Ideally, these plastic particles would be melted into blocks that are capable of forming an artificial reef when dropped to the seabed. This option is likely the best way to utilize the plastic particles, and would probably be the most economical option, because the specially-equipped ship would not travel back and forth between the cleaning spot and the port. Rather the specially-equipped ship would remain anchored and be operational 24 hours per day. The entire process of the ship removing ocean plastics and producing blocks for the artificial reef would be automated and run by computer control with minimal, if any, human involvement.

Theoretically, the specially-equipped ship would not need anyone on the ship to operate the system. A remote operator could control everything from a laptop computer anywhere in the world by way of a satellite. Artificial Intelligence could also be placed into the computer control system. There could be a fleet of these specially-equipped ships that are anchored at one of numerous strategic areas with high ocean plastic concentration. The specially-equipped ship could be left there for extended periods of time to remove plastics from the ocean 24 hours per day for months on end. The specially-equipped ship needs enough fuel to run electric generators that provide the electricity to run the system. The specially-equipped ship would preferably use solar energy to cut down on needed fossil fuels. If the specially-equipped ship is anchored at one of the high plastic concentration areas, then the system would need to periodically send out a fuel ship to refill the specially-equipped ship's fossil fuel tanks. The fuel ship could also be controlled by computer and satellite so this too could be operated without being crewed by human attendants.

BRIEF DESCRIPTION OF DRAWINGS

The drawings illustrate preferred embodiments of the specially-equipped ship according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
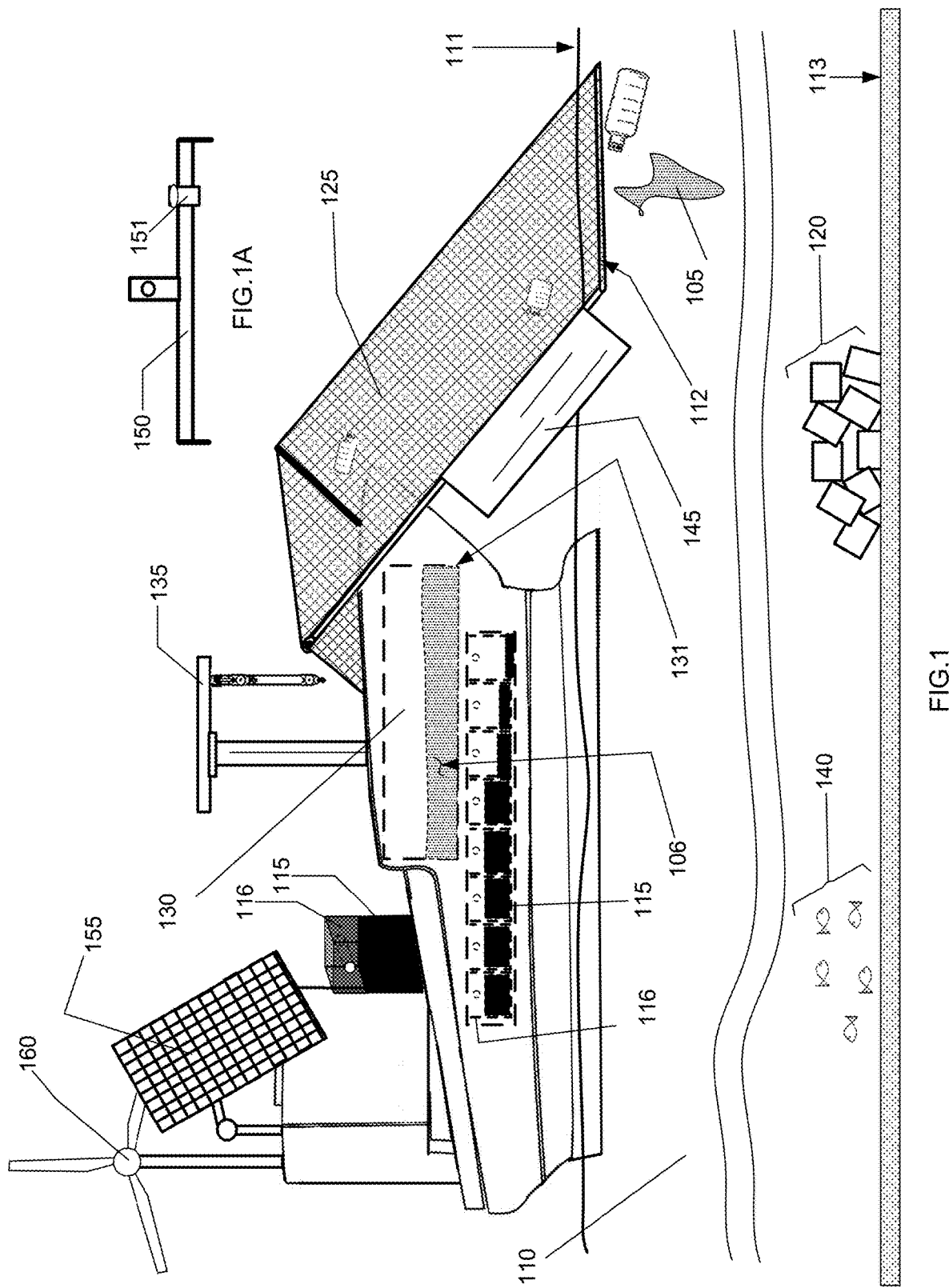
FIG. 1 is a front perspective view of one embodiment of the specially-equipped ship.
Figure 2:
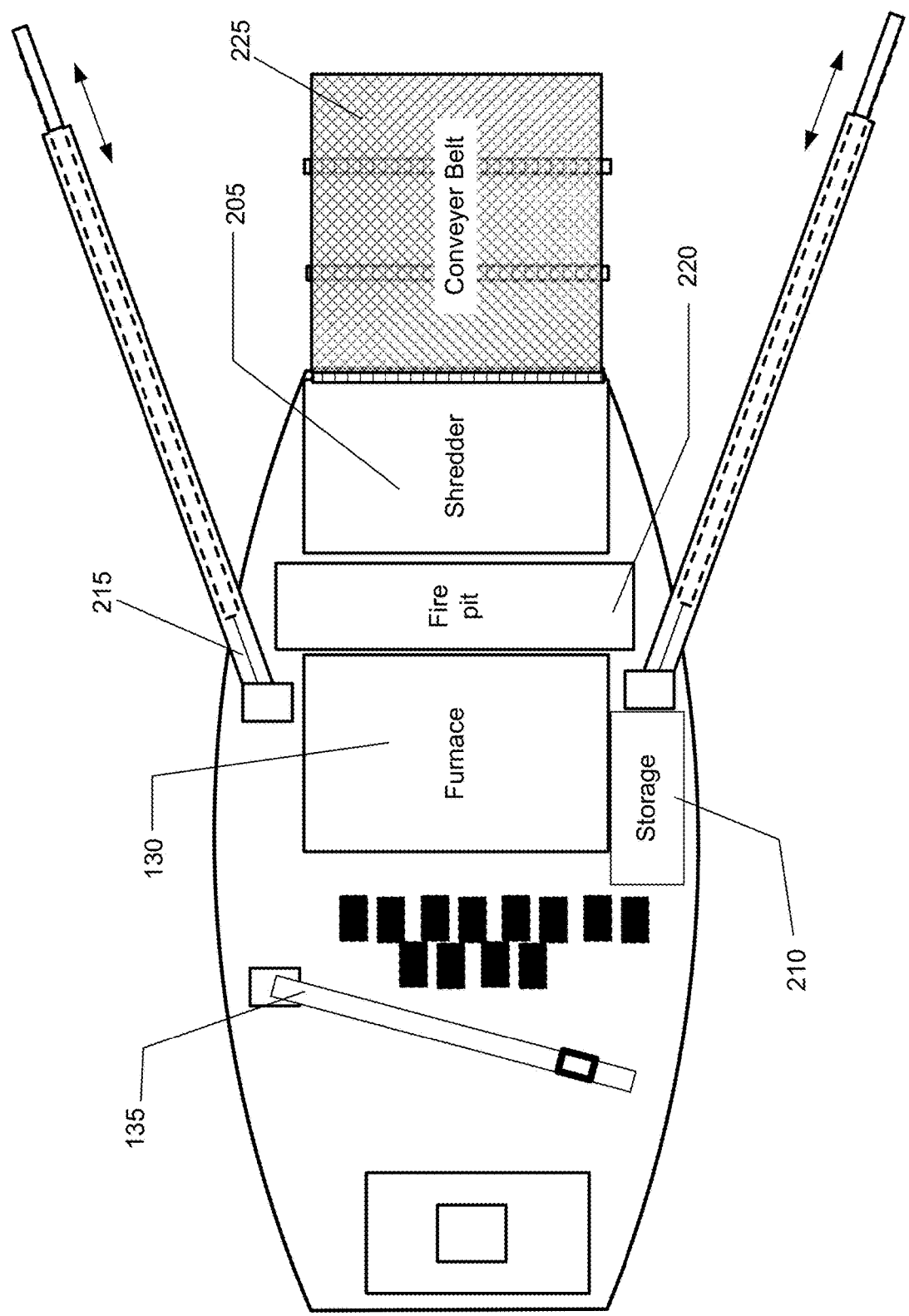
FIG. 2 is a top view of a second embodiment of the specially-equipped ship.
Figure 3:
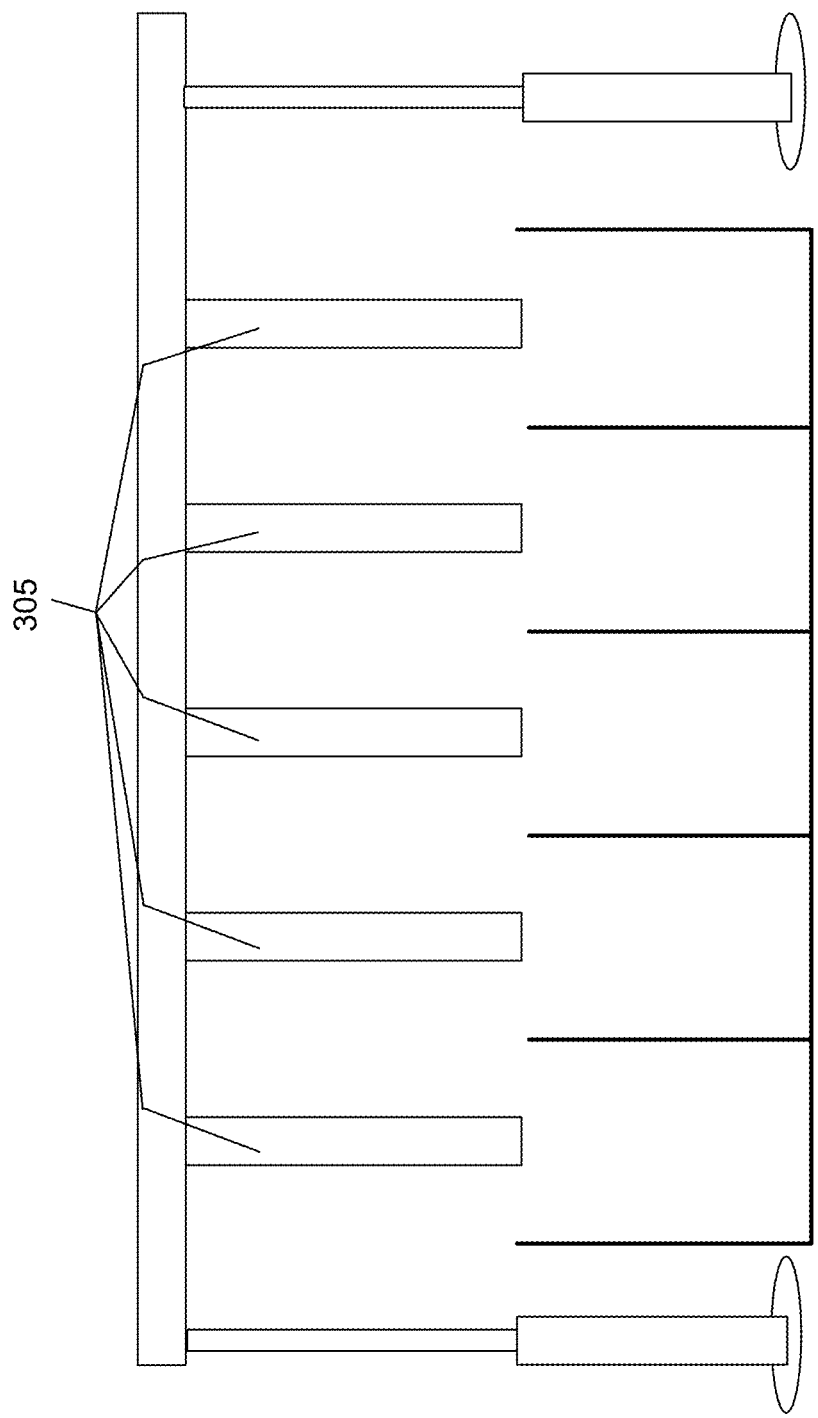
FIG. 3 is a side elevation view of molds and pipes configured to be extracted from the molds after the molten plastic hardens.

FIG. 1 is a side elevation view of a ship (100) that is configured for environmental cleanup to collect a plastic waste (105) floating in an ocean (110), the ship (100) further configured for melting the plastic waste (105) and cooling into a solidified block (115) to build an artificial reef (120) for aquatic biota (140). The ship (100) includes a conveyor belt (125); a furnace (130); a davit (135). The ship optionally includes: a shredder (205); a storage compartment (210); a fish escape (145); a vertical wall (215); a boring machine (705); a lid (150) for the furnace (130); an array of photovoltaic cells (155); and a windmill (160).

The conveyor belt (125) is fixed to the ship (100), the conveyor belt (125) configured to be extended downwardly from a point on the ship (100) above a surface of the ocean (111) to a subsurface point (112), the conveyor belt (125) further configured to engage with and draw up the plastic waste (105) onto the ship (100). The conveyor belt (125) is preferably made of stainless steel in the form of an open-mesh screen (225) that permits water to return to the ocean (110). The conveyor belt (125) may also be rubber coated so as to further prevent rusting. The conveyor belt (125) preferably has an electric motor that rotates the belt. Alternatively, a gasoline powered engine rotates the belt. The conveyor belt (125) may also include protrusions to help grab the plastic waste.

The furnace (130) is attached to the ship (100) at a location (131) configured to make a molten plastic (106). The furnace (130) is further configured so that the plastic waste (105) can be loaded into the furnace (130). The furnace (130) further configured to heat the plastic waste (105) to a melting temperature of at least 149 degrees Celsius (300 degrees Fahrenheit).

The furnace (130) may be heated by any energy source. The furnace (130) is preferably heated by gas or electric. The furnace (130) is preferably configured to heat the plastic waste until the plastic waste (105) transitions to a liquid. The furnace (130) may melt plastic waste directly after receiving the plastic waste (105) from the conveyor belt (125) or, optionally, directly from the shredder (205).

Preferably, the plastic waste (105), whether shredded or whole, is fed into the furnace by gravity. Use of shredded plastic particles enables the plastic waste (105) to be fed by a pneumatic system. The furnace (130) preferably includes a lid (150) or top so that molten plastic cannot splash out of the furnace (130) in rough seas. The lid (150) may be added or removed by the davit (135) or preferably it is rotatably attached to the furnace (130) and may be lowered or raised by a motor. The lid (150) preferably includes a pressure relief valve ((151) to provide an outlet for steam.

The furnace (130) is preferably configured with a mold (116) that contains the molten plastic (106). The mold (116) allows the molten plastic (106) to form into solidified block (115).

Alternatively, the molten plastic (106) may be pumped into a mold that is separate and apart from the furnace (130). Alternatively, the mold (116) is located below the furnace (130) in a configuration to receive molten plastic (106) by gravity feed from the furnace (130). The mold (116) may include a removable shaft (305) extending through the molten plastic (106) so as to create a vacant hole in the solidified block (115) once the removable shaft (305) is removed. The removable shaft (305) optionally has a sheath around it to facilitate removal of the removable shaft (305) from the solidified block (115).

Figure 4:
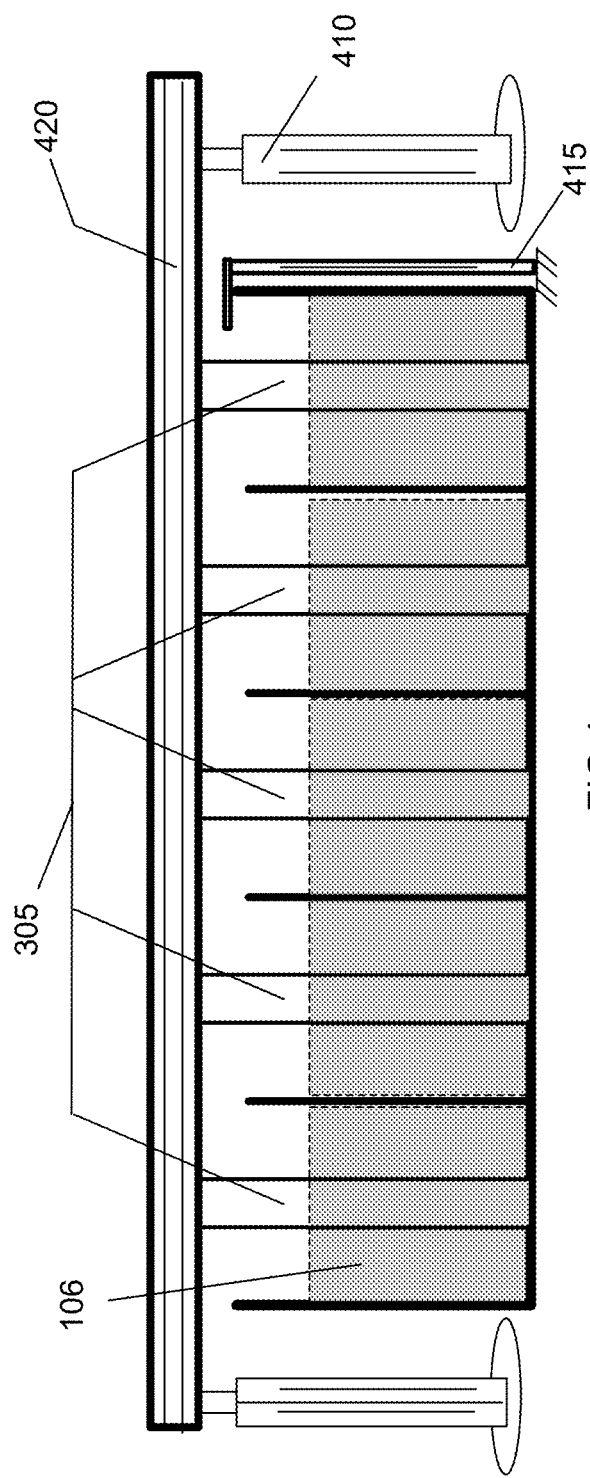
FIG. 4 is a side elevation view of molds and pipes within molten plastic and the hydraulic system to remove the pipes after it hardens.
Figure 6:
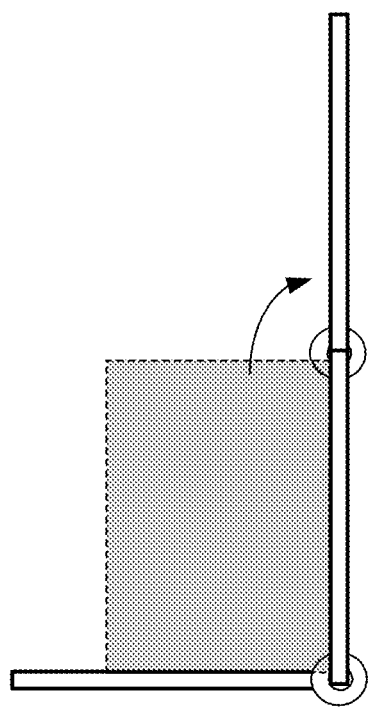
FIG. 6 is a side elevation view of a mold with a rotatable door in the open position enabling release of the solidified block of plastic.
Figure 5:
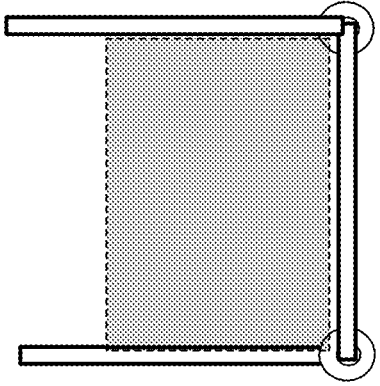
FIG. 5 is a side elevation view of a mold with a rotatable door in the closed position prior to release of the solidified block of plastic.
Figure 8:
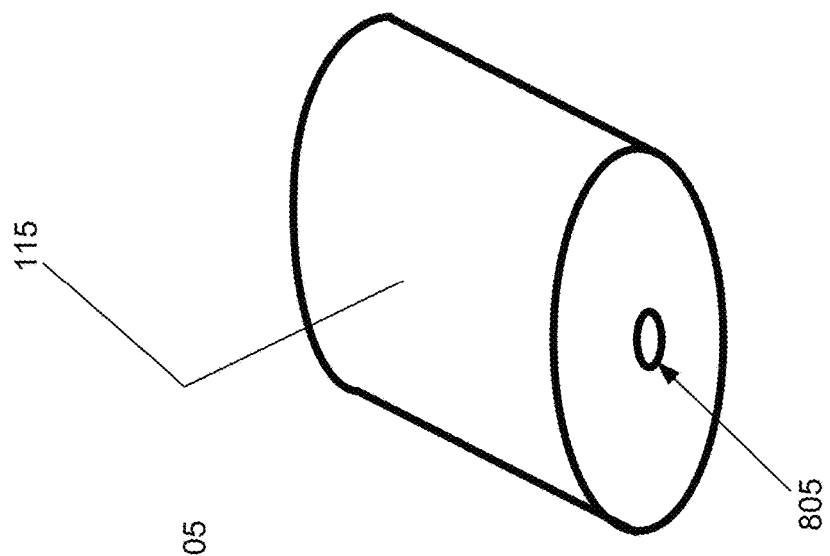
FIG. 8 is a perspective view of a solidified block with a hole through its center.
Figure 7:
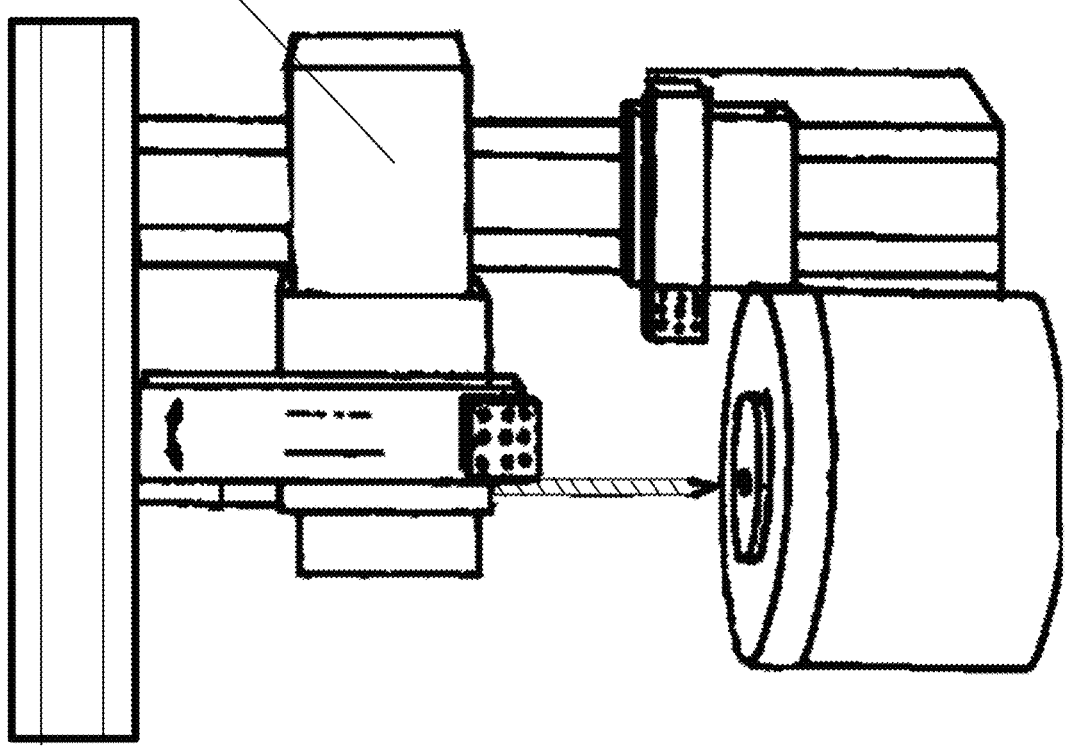
FIG. 7 is a front elevation view of a boring machine.

Preferably, as shown in FIG. 4, a hydraulic jack (410) is configured to remove the removable shaft (305) from each solidified block (115) when a plurality of molds is utilized. Optionally, one or more of a restraining arm (415) may be used to hold the plurality molds against the upward force created by the hydraulic jack (410). When a plurality of molds is used, preferably, an upper beam (420) interconnects each removable shaft (305) so that the hydraulic jack (410)

operates on the plurality of molds together. Thus, the removable shaft (305) is optionally configured to be hydraulically extracted from the plurality of molds as shown in FIG. 4. Once extracted, each solidified block (115) has a hole (805) through it.

Preferably, the molds also have a lid to prevent splash out. Optionally, the mold (116) may be hydraulically opened to free up the solidified block (115). Preferably, each mold (116) has a disposable lining that separates the solidified block (115) from the walls of the mold (116) so that the walls easily release the solidified block (115).

Preferably, each solidified block (115) has a hole (805) through it to enable greater access for fish once it is placed on the seabed (113). The hole (805) may be created by a pipe remaining in the mold (116) or may be created by hydraulically removing the pipe from the solidified block (115). Preferably, each mold (116) opens to free the solidified block (115) and then the solidified block (115) is dropped into the ocean (110) by a grabber arm on a davit (135). The piling up of solidified blocks creates an artificial reef (120) to support aquatic biota (140).

The davit (135) is configured to access the solidified block (115) after hardening of the molten plastic (106). The davit (135) is further configured to then drop the solidified block (115) into the ocean (110) so that it ultimately rests on the seabed (113). The davit (135) in its simplest form is a crane that projects over the side of the ship (100) to enable dropping the solidified block (115) into the ocean (110).

Figure 9:
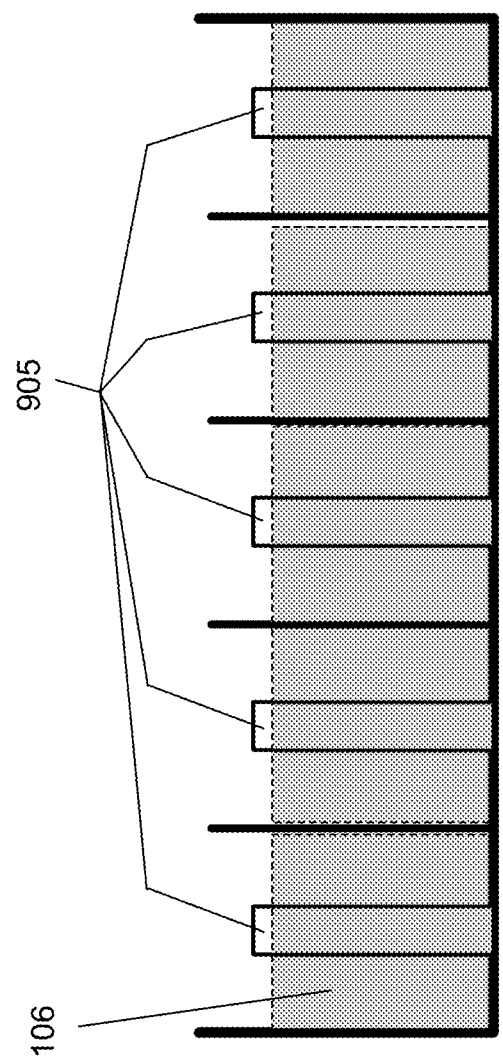
FIG. 9 is a side elevation view of five molds, each with a center through pipe that is intended to remain in the solidified block.

The ship (100) optionally includes a plurality of pipes (905) extending through the molten plastic (106) in a plurality of molds, as shown in FIG. 9. The plurality of pipes (905) has a melting temperature above the melting temperature reached by the furnace (130) so that they retain their shape within the molten plastic (106). The plurality of pipes (905) is configured to remain within the plurality of molds until the molten plastic (106) solidifies.

The ship (100) optionally includes a shredder (205) configured to receive the plastic waste (105) from the conveyor belt (125). The shredder (205) is further configured to mulch the plastic waste (105) prior to the plastic waste (105) being loaded into the furnace (130). The shredder (205) mulches or grinds the plastic waste (105) into particles to promote transport and melting of the plastic waste (105). Preferably, the shredder (205) is configured to permit seawater to drain back into the ocean. The shredder (205) optionally feeds some of the particles to a storage compartment (210) for later burning to heat the furnace (130).

The ship (100) optionally includes a fish escape (145) along a side of the conveyor belt (125). The fish escape (145) is configured to enable a fish on the conveyor belt (125) to slide off a side of the conveyor belt (125).

The ship (100) optionally includes a vertical wall (215) attached to the ship (100) on one or both sides. The vertical wall (215) extends upwardly from sea level at a side of the conveyor belt (125). The vertical wall (215) is configured to be telescoped outwardly from the ship (100) to an end position beyond the conveyor belt (125) so as to guide the plastic waste (105) floating in the ocean (110) towards the conveyor belt (125). The vertical wall (215) preferably defines small holes along its vertical length so as to allow ocean water to pass through it. Each small hole is preferably made by adding a stainless steel fixture with a hole through the fixture. Since the stainless steel fixture spans the thickness of the vertical wall (215), the stainless steel fixture allows salt water to pass through it while contacting only stainless steel. Preferably, the telescoping function enables adjustment as to how far to telescope outward up to the maximum extension.

The ship (100) optionally includes a boring machine (705) configured to bore a hole into the solidified block (115). The boring machine (705) is further configured so that particles created by boring the hole are collected for addition to the furnace (130).

The ship (100) optionally includes a lid (150) configured to sit atop the furnace (130). The lid (150) is configured to prevent melted plastic from sloshing out of the furnace (130).

The ship (100) optionally includes a fire pit (220) configured to burn plastic waste (105) as a source of heat for the furnace (130).

The ship (100) optionally includes an array of photovoltaic cells (155) to produce electric energy for operation of electrical equipment on the ship (100).

The ship (100) optionally includes a windmill (160) configured to produce electric energy for operation of electrical equipment on the ship (100).

Figure 10:
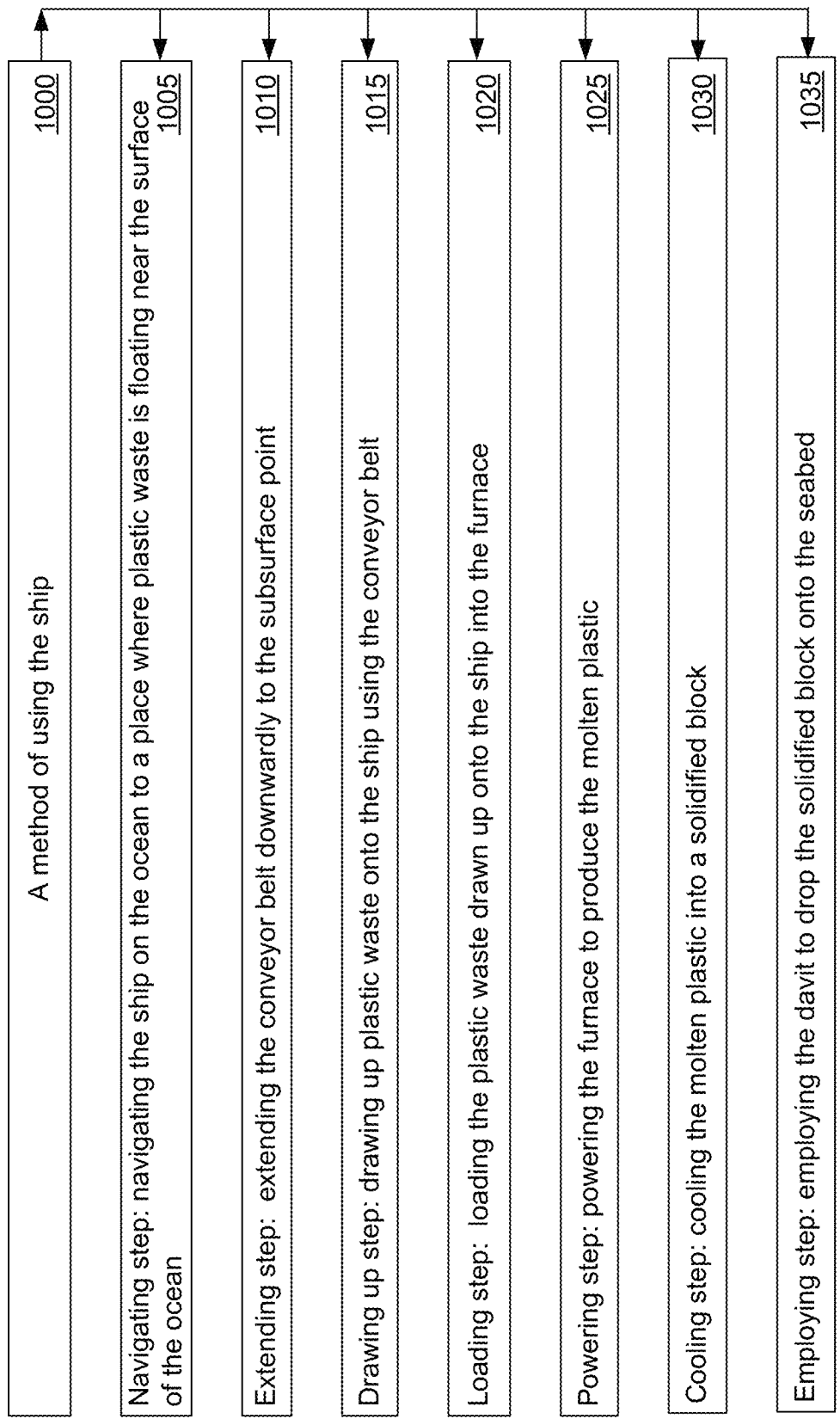
FIG. 10 is a chart of the steps in a method of using the specially-equipped ship.

A method of using the ship (100) is illustrated in FIG. 10. The method includes the following steps: A Navigating step (1005) of navigating the ship (100) on the ocean (110) to a place where plastic waste (105) is floating near the surface of the ocean (111);

An extending step (1010) of extending the conveyor belt (125) downwardly to the subsurface point (112); A Drawing step (1015) of drawing up plastic waste (105) onto the ship using the conveyor belt (125); A Loading step (1020) of loading the plastic waste (105) drawn up onto the ship (100) into the furnace (130); A Powering step (1025) of powering the furnace (130) to produce the molten plastic (106); A Cooling step (1030) of cooling the molten plastic (106) into the solidified block (115); and an Employing step (1035) of employing the davit (135) to drop the solidified block (115) onto the seabed (113).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the environmental restoration industry.

What is claimed is:

1. A ship configured for environmental cleanup to collect a plastic waste floating in an ocean, the ship further configured for melting the plastic waste and cooling into a solidified block to build an artificial reef for aquatic biota, the ship comprising:
  a conveyor belt fixed to the ship, the conveyor belt configured to be extended downwardly from a point on the ship above a surface of the ocean to a subsurface point, the conveyor belt further configured to engage with and draw up the plastic waste onto the ship;
  a furnace attached to the ship at a location configured to make a molten plastic, the furnace further configured so that the plastic waste can be loaded into the furnace, the furnace further configured to heat the plastic waste to a melting temperature of at least 149 degrees Celsius (300 degrees Fahrenheit);
  a vertical wall attached to the ship and extending upwardly from sea level to a vertical height above a deck of the ship at a side of the conveyor belt, the vertical wall configured so that at least one wall within another wall can be telescoped outwardly from the ship to an adjustable position, the adjustable position capable of being set a distance from the ship beyond the conveyor belt so as to guide the plastic waste floating in the ocean towards the conveyor belt;

the vertical wall defines holes along its vertical length so as to allow ocean water to pass through it; and a davit configured to access the solidified block after hardening of the molten plastic and the davit further configured to then drop the solidified block onto a seabed.

2. The ship of claim 1, further comprising a mold to contain molten plastic.

3. The ship of claim 2, wherein the mold is located at a position selected from the group consisting of within the furnace, and below the furnace in a configuration to receive molten plastic by gravity feed from the furnace.

4. The ship of claim 1, further comprising: a removable shaft extending through the molten plastic so as to create a vacant hole in the solidified block once the removable shaft is removed.

5. The ship of claim 4, further comprising a hydraulic jack configured to remove the removable shaft from the solidified block.

6. The ship of claim 1, further comprising a plurality of pipes extending through the molten plastic in a plurality of molds, the plurality of pipes having a melting temperature above the melting temperature reached by the furnace, the plurality of pipes configured to remain within the plurality of molds.

7. The ship of claim 1, further comprising a shredder configured to receive the plastic waste from the conveyor belt and further configured to mulch the plastic waste prior to the plastic waste being loaded into the furnace.

8. The ship of claim 7, further comprising a storage compartment to receive plastic particles from the shredder.

9. The ship of claim 1, further comprising a fish escape along a side of the conveyor belt configured to enable a fish on the conveyor belt to slide off the side of the conveyor belt.

10. The ship of claim 1, further comprising a boring machine configured to bore a hole into the solidified block, the boring machine further configured so that particles created by boring the hole are collected for addition to the furnace.

11. The ship of claim 1, further comprising a lid configured to sit atop the furnace, the lid configured to prevent melted plastic from sloshing out of the furnace.

12. The ship of claim 1, further comprising a fire pit configured to burn plastic waste as a source of heat for the furnace.

13. The ship of claim 1, wherein the conveyor belt comprises an open-mesh screen allowing water on the plastic waste to return to the ocean.

14. The ship of claim 1, further comprising an array of photovoltaic cells to produce electric energy for operation of electrical equipment on the ship.

15. The ship of claim 1, further comprising a windmill configured to produce electric energy for operation of electrical equipment on the ship.

16. A method of using the ship of claim 1, the method comprising the steps of:

navigating the ship on the ocean to a place where plastic waste is floating near the surface of the ocean;

extending the conveyor belt downwardly to the subsurface point;

drawing up plastic waste onto the ship using the conveyor belt;

loading the plastic waste drawn up onto the ship into the furnace;

powering the furnace to produce the molten plastic;

cooling the molten plastic into the solidified block; and employing the davit to drop the solidified block onto the seabed.

* * * * *